US010356614B2

(12) United States Patent
Li et al.

(10) Patent No.: US 10,356,614 B2
(45) Date of Patent: Jul. 16, 2019

(54) SECURE ELECTRONIC SUBSCRIBER IDENTITY MODULE (ESIM) RESTORATION (71) Applicant: Apple Inc., Cupertino, CA (US)

(72) Inventors: Li Li, Los Altos, CA (US); Arun G. Mathias, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 115 days.

(21) Appl. No.: 15/356,398

(22) Filed: Nov. 18, 2016

(65) Prior Publication Data

US 2017/0150356 A1 May 25, 2017

Related U.S. Application Data (60) Provisional application No. 62/258,398, filed on Nov. 20, 2015.

(51) Int. Cl.
*H04L 9/32* (2006.01)
*H04W 12/06* (2009.01)

(52) U.S. Cl.
CPC .................. *H04W 12/06* (2013.01)

(58) Field of Classification Search
CPC ...................................... H04W 12/06
USPC .......................................................... 713/168
See application file for complete search history.

(56) References Cited

U.S. PATENT DOCUMENTS

| 6,991,946 | B1 * | 1/2006 | Mahanpour ........ G01R 31/2898 438/14 |
| 2009/0227226 | A1 * | 9/2009 | Gupta ...................... H04B 7/26 455/405 |
| 2012/0331292 | A1 | 12/2012 | Haggerty et al. |
| 2013/0227646 | A1 | 8/2013 | Haggerty et al. |
| 2014/0286337 | A1 * | 9/2014 | Dolson ................... H04L 43/12 370/392 |
| 2015/0347786 | A1 | 12/2015 | Yang et al. |
| 2016/0100309 | A1 * | 4/2016 | Velusamy ............. H04W 12/08 380/270 |

OTHER PUBLICATIONS

Embedded SIM Remote Provisioning Architecture, Version 1.1; Official Document SGP.01—Embedded SIM Remote Provisioning Architecture; Jan. 30, 2014; GSM Association; 85 pgs.

* cited by examiner

Primary Examiner — Mohammad W Reza
(74) Attorney, Agent, or Firm — Dickinson Wright RLLP (57) ABSTRACT A secure element uses a backup context to restore a deleted electronic Subscriber Identity Module (eSIM) without compromising a trust relationship with a mobile network operator (MNO). A backup copy of a data binary large object (data blob) originally used to instantiate the eSIM is retrieved. The secure element determines if the eSIM within the data blob is uniquely associated with the secure element from a previous installation. The secure element examines the data blob to determine an identifier unique to the eSIM. The identifier can be an integrated circuit card identifier (ICC-ID) or a profile identifier. The secure element searches a table of instantiated eSIMs in the secure memory. If the secure element is able to match the recovered eSIM identifier with an entry in the table, then the secure element installs this eSIM in the secure element.

20 Claims, 9 Drawing Sheets

| ESIM | DATA BLOB ID | KEY | STATE |
|---|---|---|---|
| 1 | ICCID_1 | N/A (PK1_PRIVATE, ALREADY STORED) | ACTIVATED |
| 2 | PROFILE_ID_2 | EPHEMERAL_2 | INACTIVE |
| . | . | . | . |

SECURE ELECTRONIC SUBSCRIBER IDENTITY MODULE (ESIM) RESTORATION

PRIORITY APPLICATION

This application claims benefit of U.S. Provisional Patent Application No. 62/258,398 entitled "SECURE ELECTRONIC SUBSCRIBER IDENTITY MODULE RESTORATION" filed on Nov. 20, 2015, which is hereby incorporated by reference herein.

FIELD

The described embodiments generally relate to the field of wireless communications. More particularly, the embodiments pertain to systems and methods for secure restoration of an electronic Subscriber Identity Module (eSIM) at a mobile device.

BACKGROUND

Many global telecommunication service providers issue subscriber identity module (SIM) cards to their subscribers to allow individual subscribers to insert the physical SIM card within their mobile device for the purpose of gaining access to the provider's network services. A SIM is a component application of a universal integrated circuit card (UICC) "smart card," and this can be referred to collectively as a SIM card. In function, the SIM component securely stores an international mobile subscriber identity (IMSI), along with various other cryptographic keys and credentials, which can be used for network authentication.

The network-access functionality of a SIM card can be realized by an eSIM resident on a secure element in a mobile device. The secure element can be a removable universal integrated circuit card (UICC), or an embedded UICC (eUICC) corresponding to an in-device, generally non-removable, hardware component of the mobile device. The European Telecommunications Standards Institute (ETSI) and the Global System for Mobile Communications Association (GSMA) have been responsible for standardizing many features of SIM cards, UICCs and eUICCs.

A SIM or eSIM can refer to an application component of a secure element. 2G global systems for mobile communications (GSM) technologies employ SIM applications, 3G universal mobile telecommunications system (UMTS) technologies employ USIM applications and ISIM applications for Internet Protocol (IP) multimedia subsystem (IMS) services, and 2G/3G code division multiple access (CDMA) technologies employ CSIM applications.

An eSIM may have similar application functionality to any of a SIM, USIM, ISIM, CSIM, etc., and the eSIM may be compliant with different radio access technologies. Various eSIMs may be provisioned into the secure element of a mobile device by an eSIM server associated with a particular mobile network operator (MNO). An eSIM comprises access credentials such as an International Mobile Subscriber Identity (IMSI) and a subscriber key (K). The subscriber key K is a shared secret stored only at the eSIM and at the MNO. The document "Embedded SIM Remote Provisioning Architecture," Version 1.1, Jan. 30, 2014, GSM Association Official Document SGP.01, discusses provisioning.

SUMMARY

Representative embodiments set forth herein disclose various systems and techniques for recovering an eSIM using a stored data blob.

An eSIM can be provisioned to a secure element in a mobile device by a mobile network operator using a provisioning server. The focus of the provisioning is the delivery of a data blob comprising an eSIM to the secure element. The data blob is encrypted, so that the valuable access credentials present in the eSIM cannot be learned by a third party observer of the provisioning session.

The main operating system of the mobile device acts as an untrusted intermediary between the secure element and the mobile network operator. Thus, sensitive data is not exposed in the clear outside of the secure element. The mobile device can download and store data off-device using an archive system supported by the Internet. An exemplary archive system is the iCloud® online service provided by Apple Inc.

The secure element can be an eUICC (generally not removable) or a UICC (easily removable). The secure element stores one or more installed eSIMs. An installed eSIM may be referred to as present on the secure element. Each eSIM comprises one or more profile data components.

A provisioning session is started when, for example, an eSIM is to be installed on the secure element. During a provisioning session, the mobile network operator provides a data blob to the secure element. The data blob is encrypted so that only the targeted secure element can decrypt the data blob (also referred to herein as decoding the data blob). The secure element runs a decryption algorithm (or decoding algorithm) on a secure processor to decrypt the data blob using a key associated with the secure element targeted by the provisioning session. A second secure element cannot decrypt the data blob, because the second secure element does not know the key associated with the targeted secure element. Thus, the encrypted data blob can be sent in the clear (that is, without additional encryption) to the secure element, for example, over the Internet.

A user of the mobile device may accidentally or purposefully delete one or more of the profile data components of the eSIM. Or, a profile data component may become corrupted. A backup of the data blob would not be of utility in the prior art, because the secure element OS has a trust relationship with the mobile network operator and is not capable of using a backup data blob. Thus, a prior art secure element OS does not decrypt or decode a data blob and install the resulting profile data components outside of a provisioning session.

In exemplary embodiments provided herein, the secure element OS solves a need for an authorized backup of the data blob for a later decryption (decoding) and re-installation of an eSIM. In order to maintain the uniqueness of the eSIM with the secure element, the secure element creates a table of instantiated eSIMs in a secure memory of the secure element.

For later decryption (decoding) of the data blob in a backup recovery procedure, the secure element OS has access to its own PKI private key, or, if so designed, to a symmetric key installed at the time of manufacture. To maintain ability to decrypt (decode) when the key used for ciphering (encryption) was generated at the time of the provisioning session, in some embodiments, the secure element OS stores in the table a copy of, for example, an ephemeral symmetric key at the time of initial installation of an eSIM.

The secure element OS can periodically compare the eSIM identifiers in the table of instantiated eSIMs with the population of eSIMs installed on the secure element and perform recovery procedures. In some embodiments, a table entry indicates an eSIM has been deleted from the secure element after export to a second secure element.

In one example, the secure element OS seeks to restore an eSIM which is no longer installed on the secure element. The secure element OS or the main OS of the mobile device retrieves or obtains a copy of the data blob. The purpose of the secure element OS at this point is to determine if the eSIM within the data blob belongs to the secure element from a previous installation.

After recovering an identifier of the eSIM from the data blob, the secure element OS searches the table of instantiated eSIMs in the secure memory. If the secure element OS is able to match the recovered eSIM identifier (corresponding to an absent or corrupted eSIM) with an entry in the table, then the secure element OS can be satisfied that installing this eSIM in the secure element will be proper within its trust relationship with the MNO associated with the eSIM. For example, re-installation of an absent, missing, or lost eSIM and will not produce a second version of an eSIM that is already installed in some second secure element as a first version. When a match occurs from the table search, the secure element OS decrypts (decodes) the data blob using the appropriate key (PKI private key, factory-installed symmetric key, stored ephemeral symmetric key, or some other key uniquely targeted to the secure element). The data profile components of the eSIM resulting from decryption of the data blob are then installed by the secure element OS in the secure element. In some embodiments, the data profile components are installed in the secure memory of the secure element. The eSIM can then be used to perform, for example, an authentication and key agreement (AKA) with the mobile network operator in order to gain access to network services.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Provisioning of an eSIM

Provisioning by an eSIM server can be done using the following steps: i) create an eSIM data object at an eSIM vendor, ii) package the eSIM data object and encrypt it with a key associated with a target secure element to create a data binary large object ("data blob"), iii) send, through a wired or wireless connection, the data blob to the secure element of a user equipment (UE), iv) decrypt the data blob on a secure processor using the key associated with the secure element to produce a plurality of profile data components representing the eSIM, and v) install the plurality of profile data components in the secure element. Removing the effect of encryption by decrypting an encrypted message or encrypted data object can also be referred to as decoding the encrypted message or encrypted data object. The management of the provisioning within the secure element is done by a secure element operating system (OS). For example, if the secure element is an eUICC, the management of the provisioning within the eUICC is done by an eUICC OS. Generally, a secure element OS is executed on a secure processor of the secure element for sensitive security computations and uses a secure memory of the secure element for sensitive security data. MNOs may provision one or more proprietary eSIMs to a mobile device remotely (e.g., over the Internet), upon request or autonomously and transparently to a user of the mobile device.

As a brief aside, data security comprises two basic activities: maintaining data secrecy and determining that a communicating party or message is authentic. Secrecy is generally maintained using encryption and authentication is generally achieved by challenging a party to demonstrate knowledge of a secret. Imposing encryption on a data payload is sometimes called ciphering. A key used for encryption may be referred to as a cipher key. Determining that a message is authentic is sometimes performed using an integrity key.

A popular method of authentication is using public key infrastructure (PKI). PKI works as follows. A party who wishes to be able to prove to anyone their identity ("to be authenticated") creates a PKI public key/private key pair. The public key is stored in a certificate at a certificate authority (CA). A CA is an entity that everyone trusts. The party keeps their private key secure and never shares it with anyone. A second party can request the certificate from the CA to obtain the public key of the party to be authenticated. The second party then encrypts a challenge message with the public key and sends the encrypted challenge message to the party to be authenticated. The second party itself is unable to decode the message it created because the public key is not useful for decoding. The party to be authenticated receives the encrypted challenge and decrypts it with its private key. Decrypting can also be referred to as decoding. The party to be authenticated can then demonstrate knowledge of the message contents, and thereby prove possession of the private key. Thus, the PKI private key is an example of a credential. Since only the party to be authenticated possesses the private key, identity has been proved. The system fails if the private key is compromised (i.e., the private key is obtained by a third party). In the case of a compromised private key, the CA makes an entry marking the certificate and public key as void and henceforth no one will attempt to authenticate using the void public key.

A provisioned eSIM stored within a secure element of a mobile device can be activated via the eSIM server of a corresponding MNO to allow the mobile device to communicate using a wireless network associated with that MNO. A provisioned eSIM can remain inactive within the secure element of the mobile device for an indefinite period of time, until the inactive eSIM is activated by the MNO to which it is associated. The secure element of a mobile device may store any number of inactive eSIMs. Generally speaking, only one eSIM is active at a given time for enabling use of a particular MNO service.

A problem arises if one or more of the profile data components of an eSIM is deleted or becomes corrupted. Currently, when an eSIM is deleted, a user of a mobile device typically contacts the MNO corresponding to the eSIM, cancels the subscription associated with the eSIM, and requests provisioning of a replacement eSIM. This can be a nuisance to the user of the mobile device. An eSIM may be deleted, for example, accidentally by a user of the UE, or an eSIM may be deleted, for example, as part of a firmware update, or an eSIM may be deleted, for example, as part of a trouble shooting procedure when network access is unsuccessful. Storing a copy of an eSIM off of the secure element in the mobile device may pose security issues and care must be taken, for example, because an eSIM provides access to valuable network services and the mobile device is not a trusted entity from the point of view of the MNO. One reason for this is that, in the event the mobile device memory is hacked, the eSIM could be copied, and the copied eSIM could be used to activate a cloned wireless device. Improved methods and devices for restoration of a deleted or corrupted eSIM are needed.

Exemplary Restoration of an eSIM

An eSIM can be provisioned to a secure element in a mobile device by a mobile network operator using a provisioning server. The mobile network operator communicates with the secure element via a radio access network comprising base stations. Alternatively, the mobile network operator communicates with the secure element via the Internet and a wired connection. In addition or in the alternative, the mobile network operator can communicate with the secure element using the Internet and an Institute of Electrical and Electronics Engineers (IEEE) 802.11 technology ("Wi-Fi"). The focus of the provisioning is the delivery of a data blob comprising an eSIM to the secure element. The data blob is encrypted, so that the valuable access credentials present in the eSIM cannot be learned by a third party observer of the provisioning session.

The mobile device comprises a mobile device processor, memory, baseband component and a secure element. An expression used interchangeably herein for mobile device is UE. The baseband component of the mobile device, using a baseband operating system, provides functions needed for wireless communication with the base stations of the mobile network operator and generally provides functions for other communications such as Wi-Fi. The mobile device processor supports user applications using a main operating system. The secure element comprises a secure processor and a secure memory and is in communication with both the mobile device processor and the baseband component. The main operating system of the mobile device acts as an untrusted intermediary between the secure element and the mobile network operator. Thus, sensitive data is not exposed in the clear outside of the secure element. The mobile device can download and store data off-device using an archive system supported by the Internet.

A user of the mobile device may accidentally or purposefully delete one or more of the profile data components of the eSIM. Or, a profile data component may become corrupted. Generally, a user of a mobile device from which a profile data component, or in general, an eSIM, has been deleted would re-start a SIM activation process by contacting the mobile network operator for a new eSIM.

The secure element OS is a party trusted by the mobile network operator, and so the secure element OS performs only those functions which conform to the trust relationship. The mobile network operator provides services based on the credentials in an eSIM. Therefore, the mobile network operator does not expose an eSIM to copying and use by third parties. Thus, the secure element OS does not decrypt a data blob and install the resulting profile data components outside of a provisioning session.

In some embodiments disclosed herein, the secure element OS satisfies a need for an authorized backup of the data blob for a later decryption and re-installation of an eSIM. In order to maintain the uniqueness of the eSIM with the secure element, the secure element creates a table of instantiated eSIMs in a secure memory of the secure element. Each time an eSIM is provisioned to the secure element, the secure element populates a row in the table of instantiated eSIMs with an identifier of the eSIM. The identifier can be an Integrated Circuit Card Identifier (ICC-ID) of the eSIM or a profile ID of the eSIM. Both of these identifiers are unique to the eSIM. The secure element OS or the main OS of the mobile device stores a copy of the data blob in mobile device memory or with an archiving service on the Internet or at another memory device or location. The blob can be stored anywhere, in a security sense, because third parties are unable to decrypt or decode it.

In general, the secure element OS uses a key in a decryption algorithm running on the secure processor to decrypt (equivalently decipher, decode) the data blob. The key used for decryption can be a private key of a PKI public key/private key pair. The PKI public key/private key pair can be stored in the secure element in the manufacturing environment, or factory, when the secure element is manufactured. Alternatively, the key can be a shared secret or based on a shared secret. The shared secret can be stored in the secure element at the factory at the time the secure element is manufactured. Alternatively, the key used for decryption can be an ephemeral key. At the time a provisioning session is started, the secure element and the provisioning server can execute a Diffie-Hellman key agreement procedure. In this procedure, the secure element OS generates a first public key/private key pair and the provisioning server generates a second public key/private key pair. An ephemeral symmetric key is then found by the secure element OS using the first private key and the second public key. The provisioning server produces the same ephemeral key, but using the second private key and the first public key. The resulting ephemeral symmetric key is used to encrypt the data blob at the provisioning server.

For later decryption of the data blob in a backup recovery procedure, the secure element OS has access to its own PKI private key, or to a symmetric key installed at the time of manufacture. To maintain ability to decrypt when the cipher key was generated at the time of the provisioning session, the secure element OS stores a copy of, for example, an ephemeral symmetric key at the time of initial installation of an eSIM. In some embodiments, the key used to encrypt the data blob is targeted to a specific secure element.

The secure element OS can periodically compare the eSIM identifiers in the table of instantiated eSIMs with the population of eSIMs installed on the secure element. If an eSIM identifier from the table of instantiated eSIMs does not have a matching eSIM installed, the secure element OS can start a recovery procedure. Alternatively, during a backup restore operation, there may be one or more entries populated in the table of instantiated eSIMs and at the same time no eSIMs installed in the secure element. The secure element starts a backup restore operation to recover those eSIMs identified in the table which are absent from the secure element. If an eSIM was exported and is thus absent, no recovery is needed.

In one example, the secure element OS seeks to restore an eSIM which is no longer installed on the secure element. For example, the eSIM may have been deleted or erased accidentally or purposefully. The secure element OS or the main OS of the mobile device retrieves a copy of the data blob from the device memory, from the Internet archive service, or from another memory source. The purpose of the secure element OS at this point is to determine if the eSIM within the data blob belongs to the secure element from a previous installation. The secure element OS, in conformance with its trust relationship with the mobile network operator, does not process (for eSIM installation) a data blob comprising an eSIM that does not belong to the secure element. The secure element OS examines the data blob to determine an identifier unique to the eSIM. The identifier can be an ICC-ID or a profile identifier. In some embodiments, this examination includes applying decryption to the data blob to recover data in the clear and parse out an identifier of the eSIM. Alternatively, the eSIM identifier may be evident from the data blob without decryption. For example, the eSIM identifier can be in a field with a defined position and width within a descriptive control header field of the data blob while the eSIM is in a payload portion of the data blob. In this embodiment the descriptive control header is not encrypted while the payload portion of the data blob is encrypted. The eSIM is encrypted within the data blob data structure.

In some embodiments, after recovering an identifier of the eSIM from the data blob, the secure element OS searches the table of instantiated eSIMs in the secure memory. If the secure element OS is able to match the recovered eSIM identifier with an entry in the table, then the secure element OS can be satisfied that installing this eSIM in the secure element will produce a re-installation of an absent, missing, or lost eSIM and will not produce a duplicate of an eSIM which is already installed in some second secure element. Thus, when a match occurs, the secure element OS does not increase the overall global population of eSIMs via which the mobile network operator provides services. When a match occurs, the mobile network operator will subsequently only be providing network services to the mobile device based on the bona fide and uncopied credentials in the eSIM.

When a match occurs, the secure element OS decrypts the data blob using the appropriate key (PKI private key, factory-installed symmetric key, or stored ephemeral symmetric key). The data profile components of the eSIM resulting from decryption of the data blob are then installed by the secure element OS in the secure element. The eSIM can then be used to perform, for example, AKA with the mobile network operator in order to gain access to network services. The network services can be making and receiving voice calls, internet browsing, uploading or downloading data files, for example.

AKA is a method by which the eSIM and the mobile network operator authenticate each other and agree on keys to be used for ciphering and integrity for some period of time or for some communication session.

If the eSIM identifier recovered from the data blob does not match an entry in the table of instantiated eSIMs, then a possibility exists that the mobile device has attempted to install an unauthorized eSIM. The secure element OS may decrypt such a blob, but the secure element OS will not install the resulting possibly unauthorized eSIM into the secure element. Installation of an unauthorized eSIM would compromise the secrecy of the credentials within the eSIM. If such an unauthorized eSIM were installed in the mobile device, there is a possibility that a first and a second mobile device would request mobile operator network services based on the same credentials. The first mobile device could be a bona fide device, and the second mobile device could be a clone. A clone is an unauthorized device which could use network services without contracting for or paying for the used network services. Therefore, the secure element OS avoids installation of an eSIM for which the eSIM identifier is not found in the table of instantiated eSIMs.

The table of instantiated eSIMs and the corresponding eSIMs are associated uniquely with the secure element. In some cases, the secure element is embedded in a device. For example, the secure element can be an eUICC. However, the secure element can be a UICC. A UICC is removable and can be moved from a first mobile device to a second mobile device by a user. An eSIM could be deleted from a UICC while the UICC is in a first mobile device. Subsequently, the UICC can be moved to a second mobile device by a user. For example, the user may upgrade their mobile device. The user may buy a newer mobile device, a mobile device with more features, and/or a mobile device from a different manufacturer. In some embodiments, the eSIM backup recovery procedure is executed after the UICC is in the second mobile device. In this embodiment, the main OS of the second mobile device or the secure element OS will retrieve a data blob from an Internet archive, or from another memory source. The secure element OS of the UICC will recover an eSIM identifier from the data blob as discussed above. The secure element OS will then attempt to match the eSIM identifier with an entry in the table of instantiated eSIMs. Even if the eSIM were to have been previously installed on the secure element while the secure element was in the first mobile device, the secure element OS will find a positive match because the table of instantiated eSIMs is stored within a secure memory of the secure element (UICC, for example) itself. The secure element OS will proceed to decrypt and install the eSIM based on a positive match. In some embodiments, the eSIM provides credentials for a first mobile device and subsequently (but not simultaneously) provides credentials for the second mobile device. There is no duplication of credentials because the secure element (UICC) has moved from the first mobile device to the second mobile device. In a logical sense, the eSIM credentials moved with the table of instantiated eSIMs within the secure element to the second mobile device.

Overall System

Figure 1:
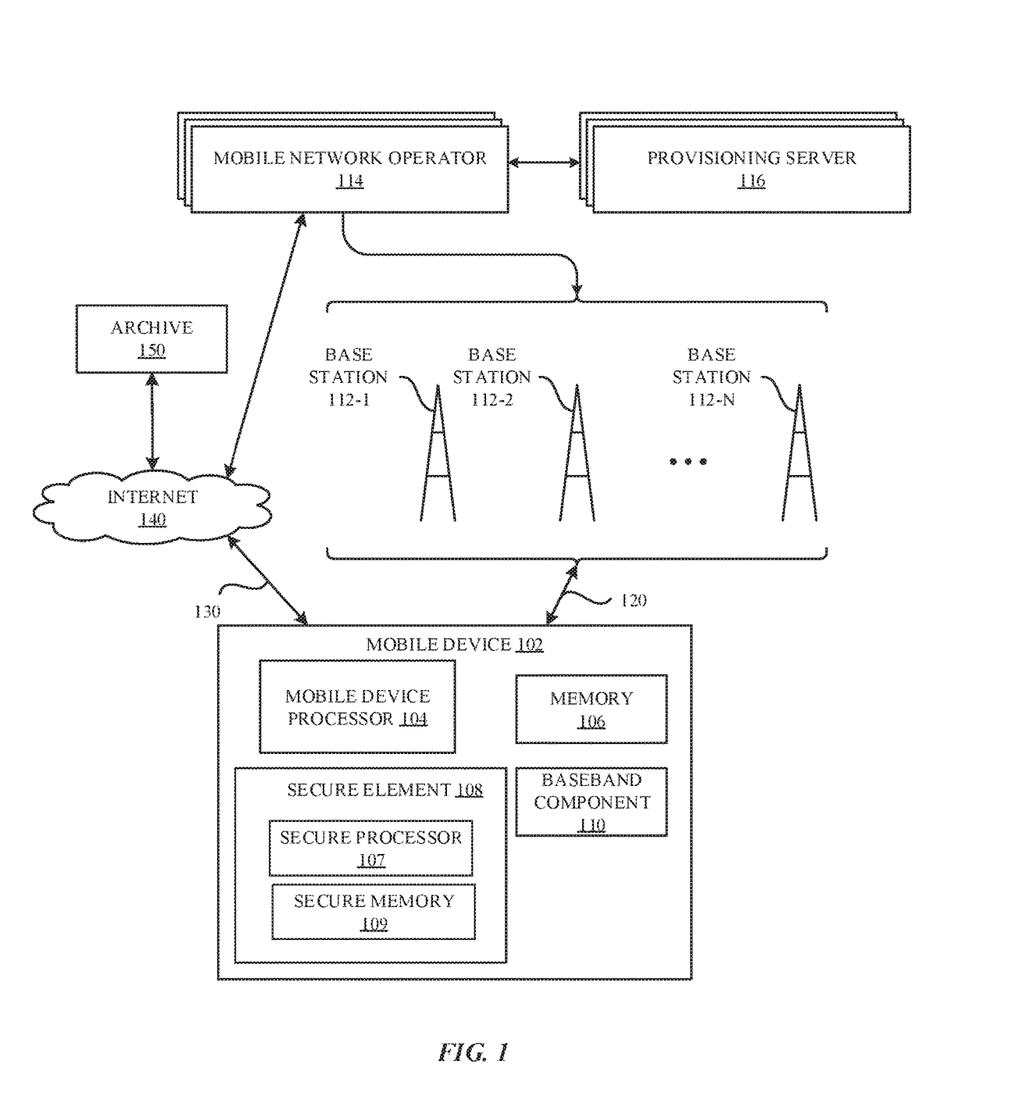
FIG. 1 illustrates an exemplary mobile device comprising a secure element in accordance with some embodiments. The mobile device is in communication with a provisioning service via a mobile network operator and in communication with a memory storage device, or archive, via the Internet in accordance with some embodiments. The exemplary secure element comprises a secure processor and a secure memory in accordance with some embodiments.

Exemplary embodiments will now be described with the aid of FIGS. 1-9. An eSIM can be provisioned to a secure element 108 in a mobile device 102 by a mobile network operator 114 using a provisioning server 116 as shown in FIG. 1. The secure element 108 comprises a secure processor 107 and a secure memory 109. The mobile network operator 114 communicates with the secure element 108 via a radio access network comprising base stations 112 over a connection 120. Alternatively, the mobile network operator 114 communicates with the secure element 108 via the Internet 140 and a connection 130. In yet another alternative, the mobile network operator communicates with the secure element using the Internet and Wi-Fi (not shown). The focus of the provisioning is the delivery of a data blob comprising an eSIM to the secure element 108. The data blob is encrypted, so that the valuable access credentials present in the eSIM cannot be learned by a third party observer of the provisioning session.

Mobile Device

Figure 2:
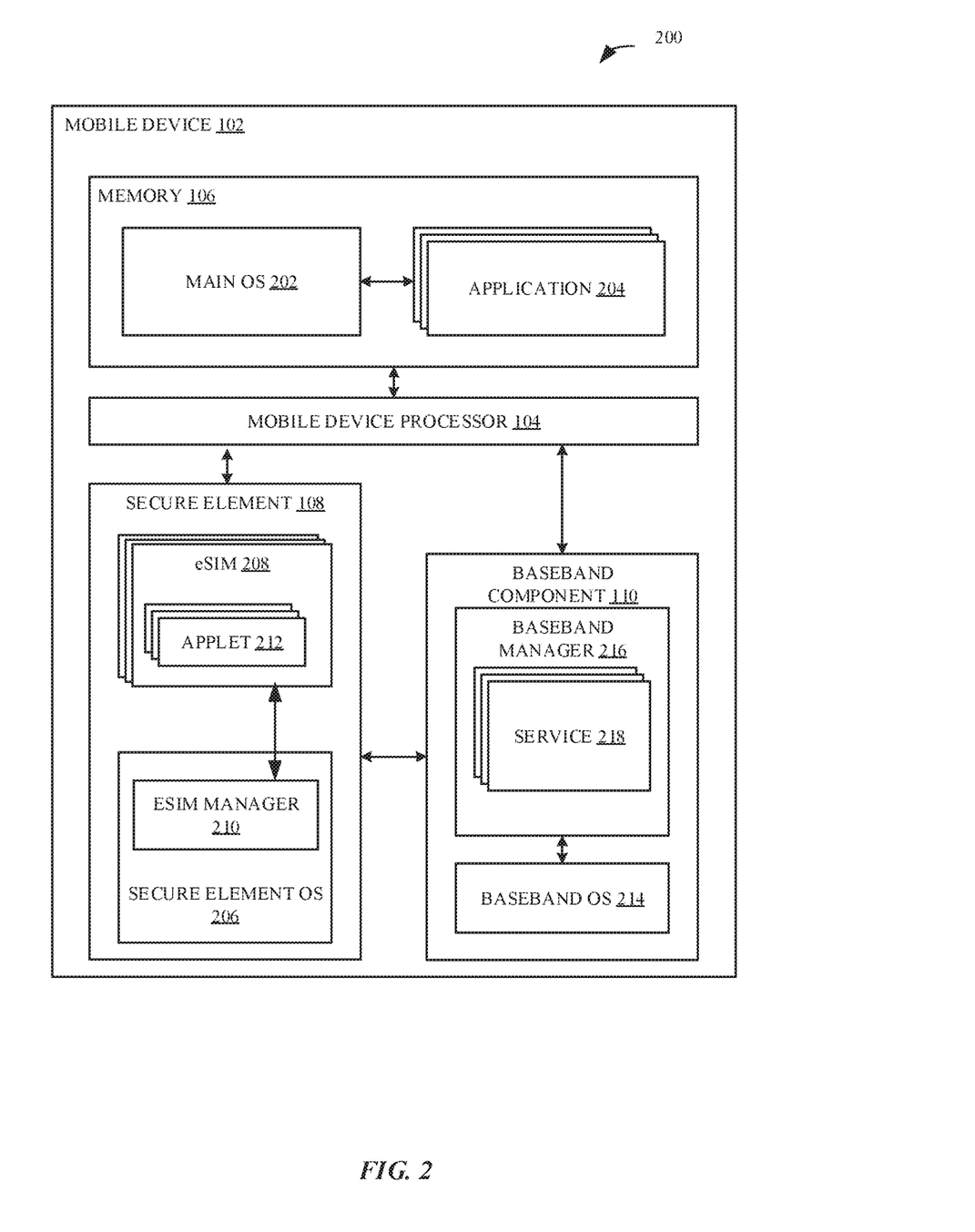
FIG. 2 illustrates an exemplary mobile device comprising the secure element and a secure element operating system and one or more eSIMs within the secure element in accordance with some embodiments.

The mobile device 102 comprises a mobile device processor 104, memory 106, baseband component 110 and the secure element 108. The baseband component 110, using a baseband operating system 214 as shown in FIG. 2, provides functions needed for wireless communication with the base stations 112 of the mobile network operator 114. The mobile device processor 104 supports a user application 204 using a main operating system 202. The secure element 108 is in communication with both the mobile device processor 104 and the baseband component 110. The main operating system 202 of the mobile device 102 acts as an untrusted intermediary between the secure element 108 and the mobile network operator 114. Thus, sensitive data is not exposed in the clear outside of the secure element 108. The mobile device 102 can download and store data off-device using an archive system 150 supported by the Internet 140 as indicated in FIG. 1.

The secure element 108 can be an eUICC or a UICC. The secure element 108 stores one or more installed eSIMs 208. One or more applets 212 can be, for example, a part of an installed eSIM 208. The eSIM(s) 208 on the secure element 108 are managed by an eSIM manager 210 within the secure element OS 206. Each eSIM 208 has one or more profile data components.

Deletion or Corruption of an eSIM or of a Portion of an eSIM

Figure 3:
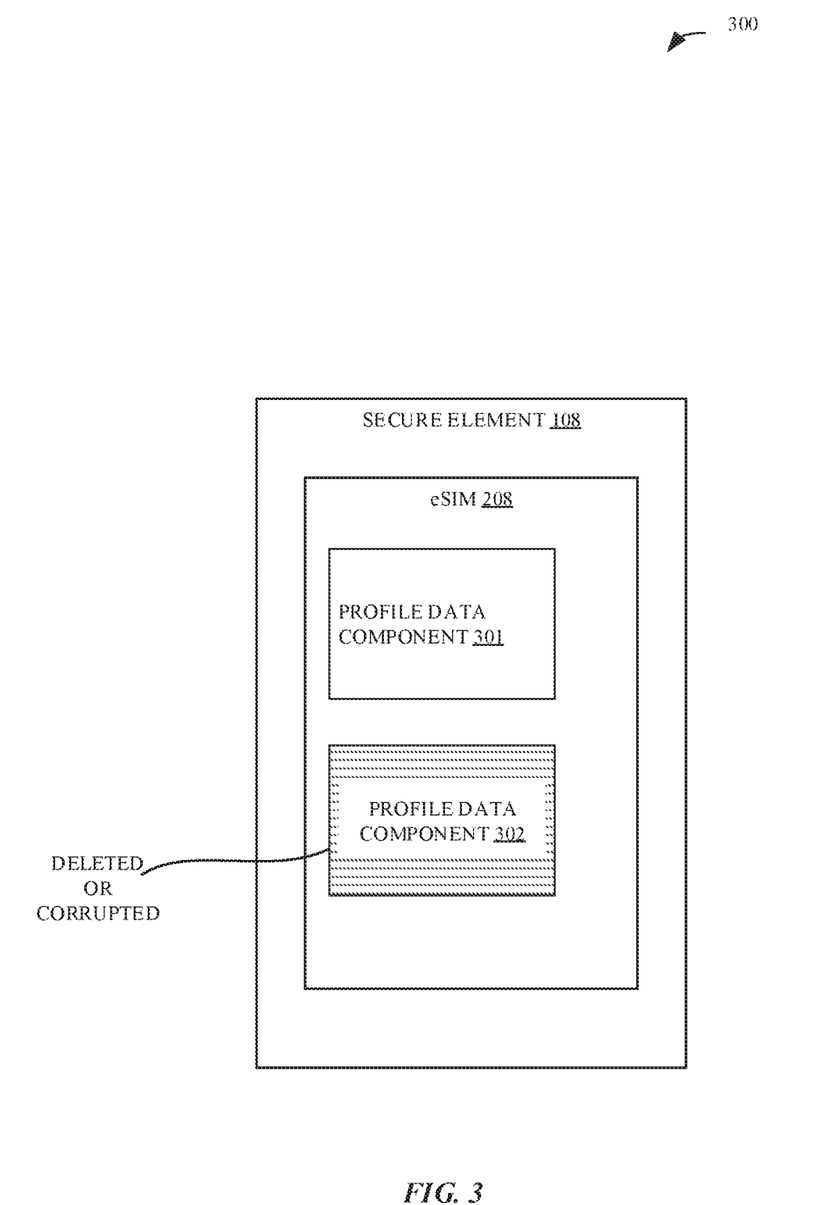
FIG. 3 illustrates an exemplary eSIM in accordance with some embodiments for which one or more profile data components have been deleted or corrupted.

FIG. 3 illustrates the secure element 108 with eSIM 208 present. eSIM 208 was originally installed on the secure element 108 with the profile data components 301 and 302. A user of the mobile device may accidentally or purposefully delete one or more of the profile data components of an eSIM. FIG. 3 illustrates an example in which the profile data component 302, shown with cross-hatched figure markings in FIG. 3, has been deleted or corrupted. Deletion may occur purposefully during a firmware update or during troubleshooting of eSIM activation. Also, an eSIM may become non-functional if a profile data component is corrupted.

Modified Provisioning Session

Figure 4:
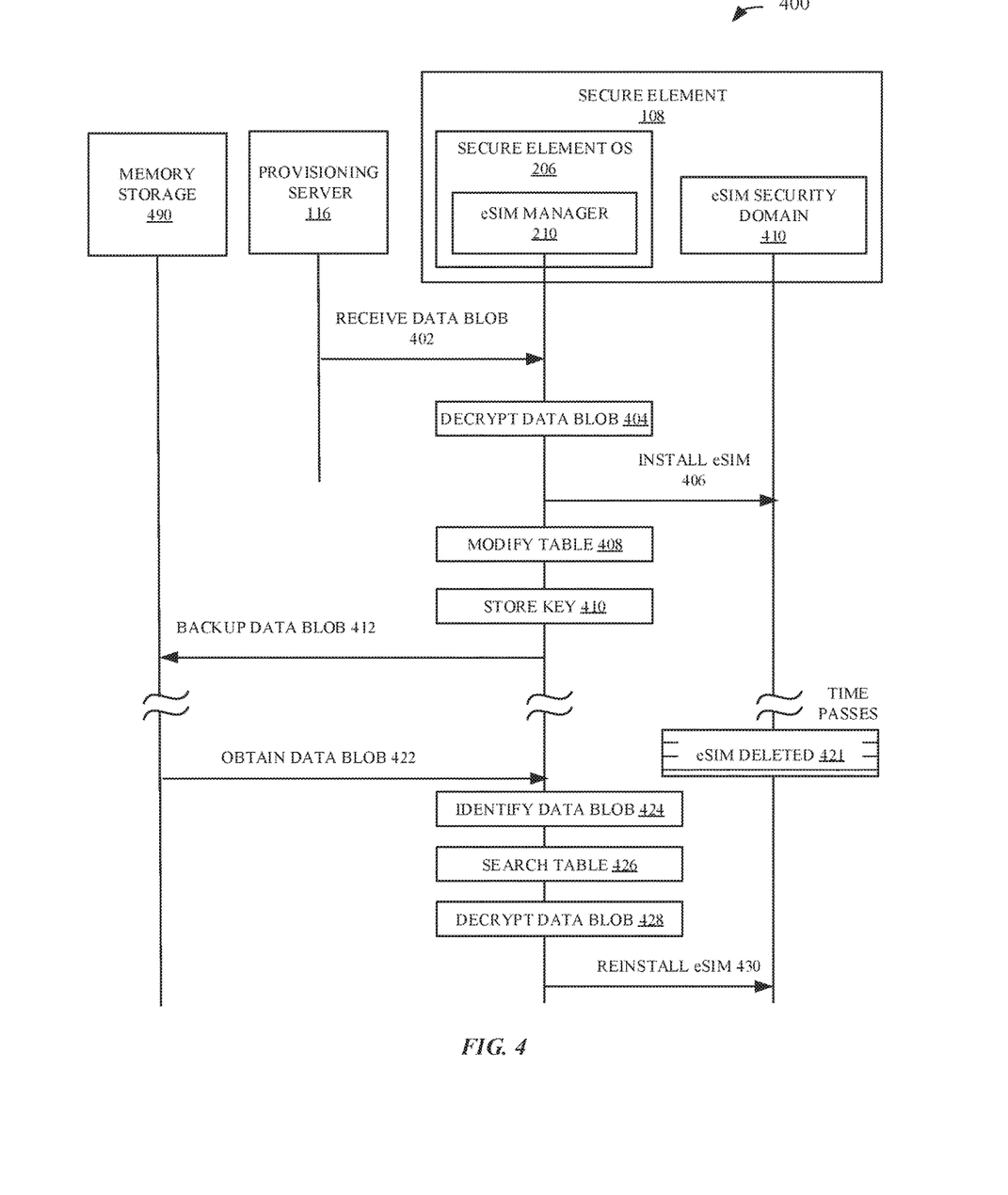
FIG. 4 illustrates exemplary actions and message and data exchanges of and between a memory storage device, a provisioning server and a secure element in accordance with some embodiments.

A modified provisioning session is disclosed herein to aid in overcoming the problem of a deleted eSIM and to avoid returning to an associated MNO requesting a replacement eSIM. Exemplary events and messages 400 including the modified provisioning session are shown in FIG. 4. A provisioning session is started whenever an eSIM is to be installed on the secure element. During a provisioning session, the provisioning server 116 provides a data blob at 402 to the secure element 108 as shown in FIG. 4. In FIG. 4, time advances from top to bottom in the figure. The first event in the figure is labelled Receive Data Blob 402. The secure element 108 decrypts the data blob at 404 using secure processor 107 and a key associated uniquely with the secure element. This decryption operation may also be referred to as deciphering. At 406 the profile data components resulting from the decryption are installed to an eSIM security domain 410 in the secure element 108. In some embodiments, the eSIM security domain 410 is within the secure memory 109.

Figure 5:
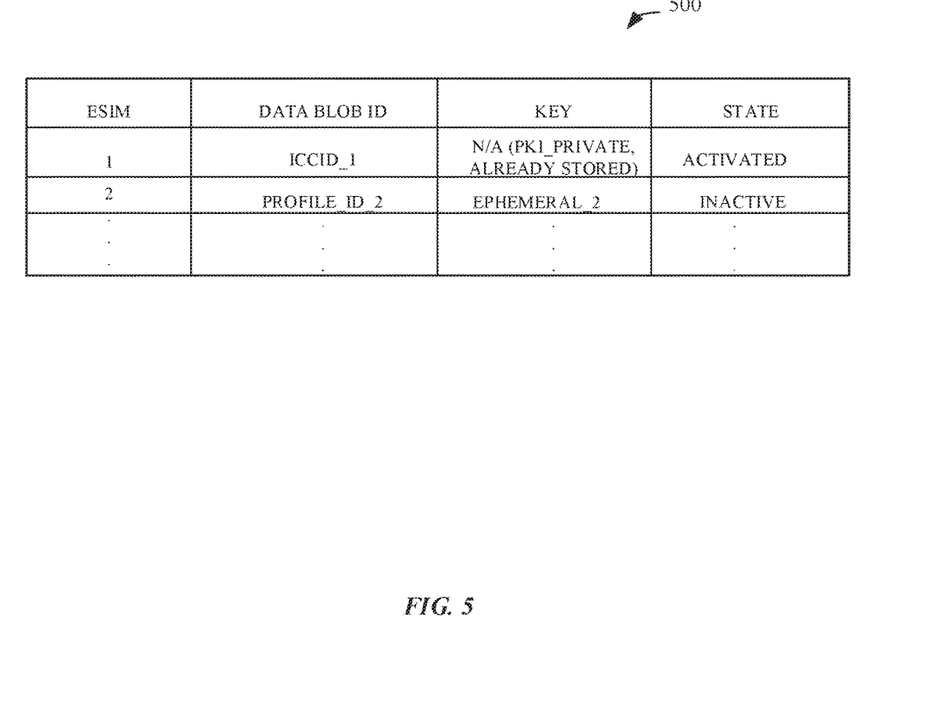
FIG. 5 illustrates an exemplary table of instantiated eSIMs in accordance with some embodiments.

The secure element OS 206 establishes a context for an authorized backup of the data blob for a later decryption and re-installation of the eSIM. In order to maintain the unique association of the eSIM with the secure element, at 408 the secure element modifies a table of instantiated eSIMs in the secure memory 109. If the table of instantiated eSIMs does not exist, it is created. When an eSIM is provisioned to the secure element 108, for example, the secure element 108 can populate or modify a row in the table of instantiated eSIMs with an identifier of the eSIM being installed as shown in FIG. 5. In the table 500 of FIG. 5, an eSIM 1 is identified by a value of ICCID_1 and has a state of Activated. Here, Activated means that, when mobile device 102 uses a mobile network operator service, those services will correspond to eSIM 1. The Activated status can also mean, for example, an AKA procedure has been executed with the mobile network operator and a key set for ciphering and integrity checking has been established. Returning to consideration of FIG. 4, at 410, if a key used for encrypting the data blob is not already present elsewhere in secure memory 109, the key used for encrypting the data blob is stored in the secure memory 109, for example, as an entry in table 500 of FIG. 5. At 412 the secure element OS 206 or the main OS 202 stores a copy of the data blob in, for example, mobile device memory 106 or with, for example, an archiving service 150 accessible via the Internet 140.

Table entry eSIM 2 is identified with a profile ID value, denoted in table 500 of FIG. 5 as Profile_ID_2. FIG. 5 is a logical representation and does not limit the disclosed embodiment to a particular data structure type.

As discussed earlier, the secure element OS uses a key to decrypt or decode the data blob. The key storing event at 410 of FIG. 4 is described here in detail. If the key used for decryption is the private key of a PKI public key/private key pair, then there is no need to store the key in exemplary table 500 of FIG. 5 because the private PKI key is already stored in the secure memory 109 from the time of manufacture. Thus, FIG. 5 illustrates an eSIM 1 having a key table entry marked N/A (not applicable). However, at 410 in FIG. 4, if the data blob decrypted at 404 to produce an eSIM 2 was encrypted with an ephemeral key, then that key will be associated with eSIM 2 by the table of instantiated eSIMs (see, for example, the table row corresponding to the value "2" in the eSIM column of table 500 of FIG. 5).

eSIM Restoration

Returning to FIG. 4, a time interval occurs during which the eSIM is used, in some instances, on the mobile device to access network services. This time interval is indicated by wavy lines annotated "TIME PASSES" on FIG. 4. The secure element OS 206 can periodically compare, during and subsequent to this time interval, the eSIM identifiers in the table of instantiated eSIMs 500 with the population of eSIMs installed on the secure element 108. If an eSIM identifier from the table 500 does not have a matching eSIM installed, such as due to event 421 of FIG. 4 ("eSIM deleted," alternatively corrupted), the secure element OS 206 can start a recovery procedure. Alternatively, during a backup restore operation, there may be one or more entries populated in the table of instantiated eSIMs 500 and at the same time no eSIMs installed in the secure element 108. Then, the secure element 108 can start a backup restore operation to recover each eSIM identified in the table as instantiated but absent from the secure element 108.

In some embodiments, the secure element OS 206 seeks to restore an eSIM 208 which is no longer installed on the secure element 108. For example, the eSIM 208 may have been deleted. At 422, the secure element OS 206 or the main OS 202 of the mobile device retrieves a copy of the data blob from the mobile device memory 106, from the Internet archive service 150, or from another memory source. A task of the secure element OS 206 at this point is to determine if the eSIM within the data blob belongs to the secure element 108 from a previous installation. At 424, the secure element OS examines the data blob to obtain an identifier unique to the eSIM. In some embodiments, this examination includes applying decryption to the data blob to recover data in the clear and parse out an identifier of the eSIM. Alternatively, the eSIM identifier can be evident from the data blob without decryption. This depends on the format of the data blob.

After recovering an identifier of the eSIM from the data blob at 424, the secure element OS 206 searches the table of instantiated eSIMs 500 in the secure memory 109. If the secure element OS 206 is able to match the recovered eSIM identifier with an entry in the table of instantiated eSIMs 500, then the secure element OS 206 can be satisfied that installing this eSIM in the secure element 108 will properly produce a re-installation of an absent, missing, or lost eSIM. Thus, the re-installation will not violate the trust relationship between the secure element OS 206 and the mobile network operator.

When a match occurs during the search at 426, the secure element OS 206 uses the secure processor 107 to decrypt the data blob at 428 using the appropriate key (PKI private key, factory-installed symmetric key, stored ephemeral symmetric key, or some other key unique to the secure element). In some embodiments, the decryption at 428 may occur before 426 or before 424. Since there are only a small number of key possibilities, secure element OS 206 may try each possible key successively in seeking a successful decryption. Successful decryption can be verified by computing a checksum and comparing the computed checksum with a decrypted checksum, for example. A checksum is an algebraic result computed over a data object which provides a high level of confidence that a data object has been correctly recovered. A properly designed hash can perform the same function as a checksum. The data profile components of the eSIM resulting from decryption of the data blob are then reinstalled at 430 by the secure element OS 206 in an exemplary security domain 410, of, for example, the secure memory 109 of the secure element 108. The eSIM can then be used to perform AKA with the mobile network operator in order to prove identity and gain confidential and proper access to network services.

Logic Flows

Figure 6:
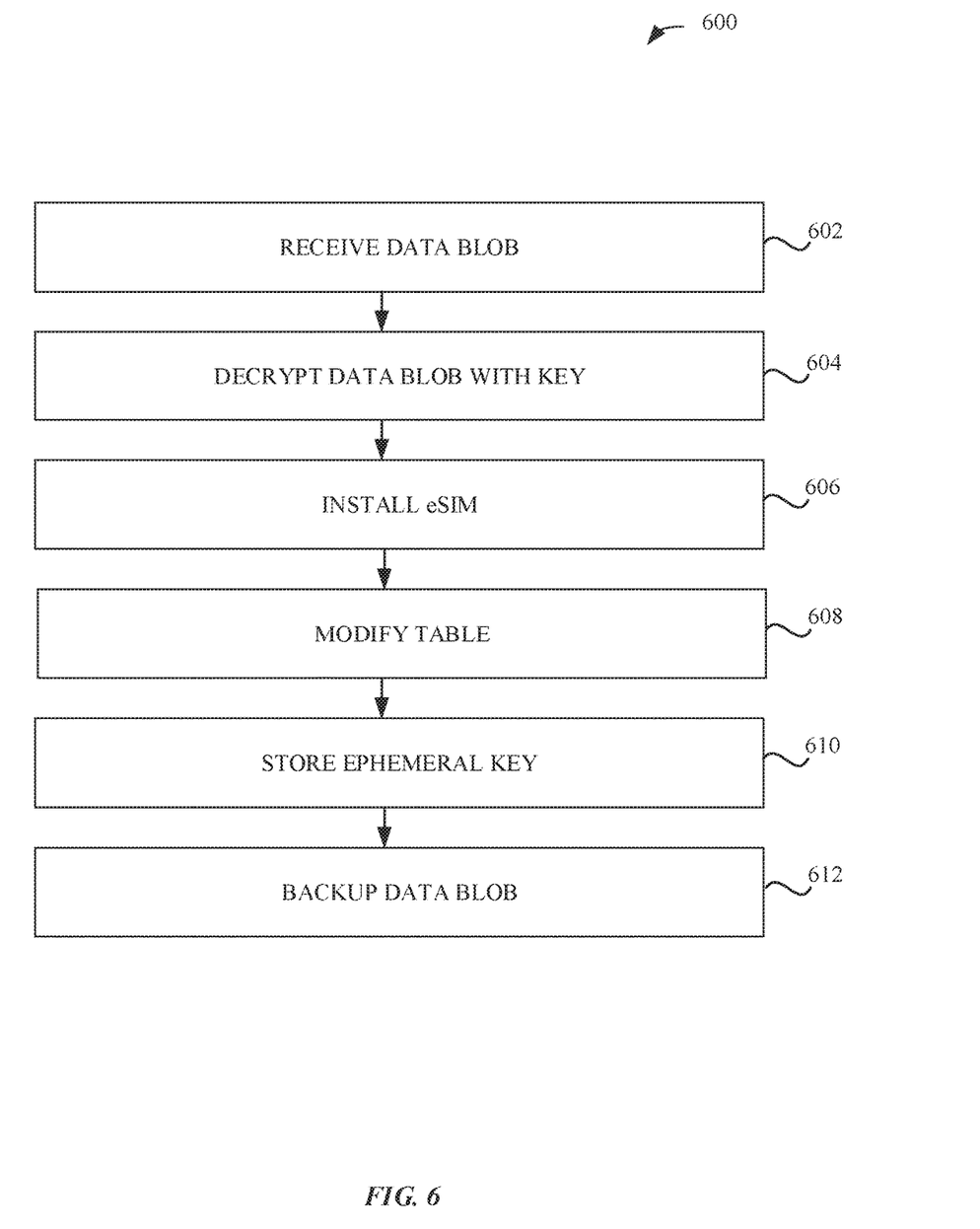
FIG. 6 illustrates exemplary logic in accordance with some embodiments for creating a secure backup context and backup data blob for an eSIM.

FIG. 6 illustrates an exemplary logic flow of creating a backup context. The term backup context is used here to comprise: i) an entry in the table of instantiated eSIMs, and ii) the stored data blob. At 602, a secure element receives a data blob during a provisioning session with a provisioning server of a mobile network operator. At 604, the secure element decrypts the data blob with a key using a secure processor. The key may be a private key of a PKI public key/private key pair, based on a symmetric key installed in the secure element at the time of manufacture, an ephemeral key created at the time of this provisioning session, or another key associated with the secure element. At 606, the secure element OS installs the profile data components which represent the eSIM into the secure element. At 608, the secure element modifies a table of instantiated eSIMs in the secure memory of the secure element by adding a row to the table. The secure element OS creates such a table in the secure memory if no table exists. The row contains a unique identifier of the data blob such as an ICC-ID or a profile ID. If the data blob was encrypted with an ephemeral key, sufficient data to recover the ephemeral key is stored in the table at 610. Such ephemeral key data is part of the backup context. The ephemeral key data may be a public key of the provisioning server and private key of the secure element, where these keys were created during the provisioning session. Finally, at 612, the secure element OS stores the data blob in a reliable, but possibly insecure, memory. This memory may be an archive memory service on the Internet, in the mobile device housing the secure element, or elsewhere.

Figure 7:
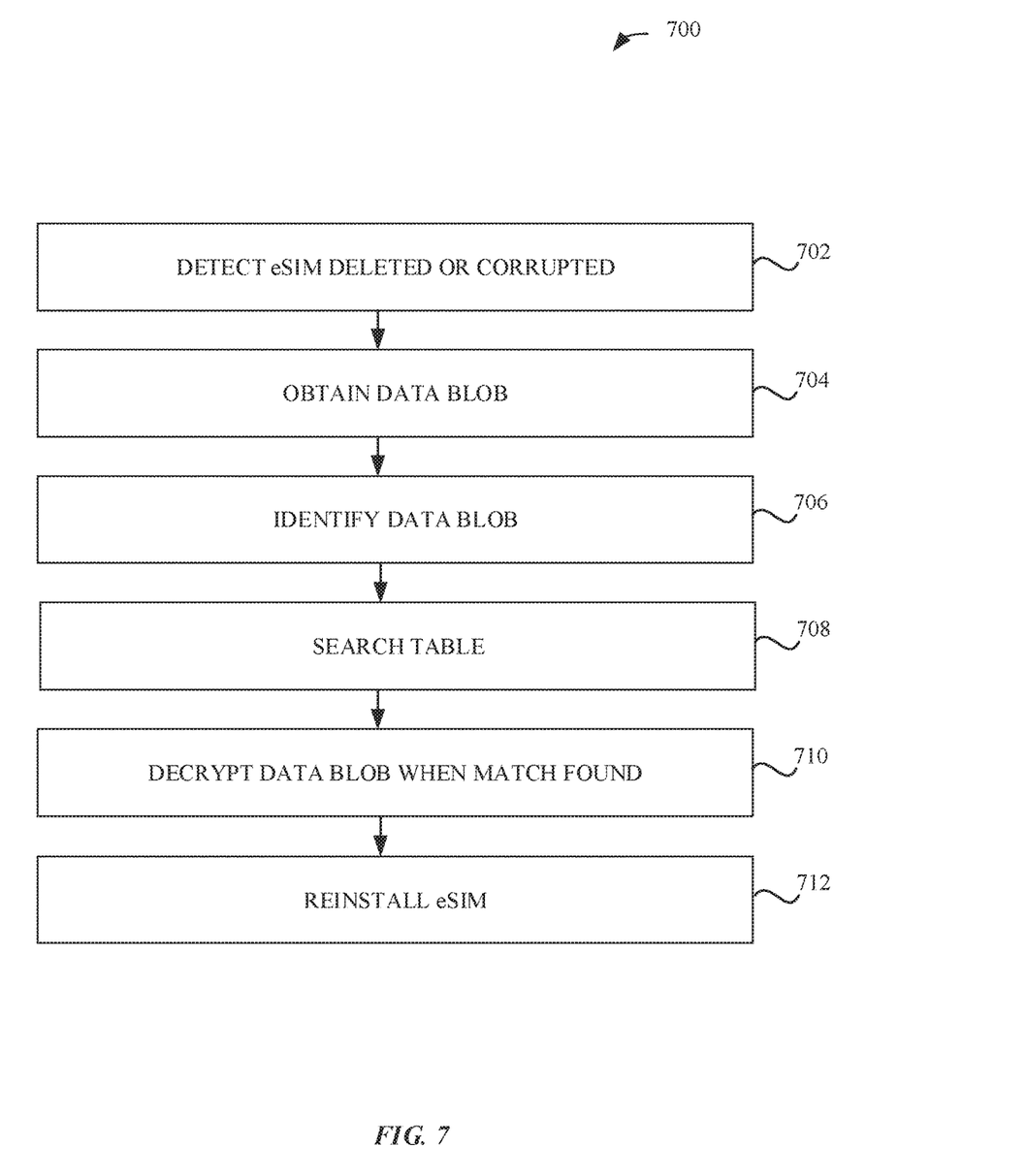
FIG. 7 illustrates exemplary logic in accordance with some embodiments for restoring an eSIM using the table of instantiated eSIMs and the backup data blob.

FIG. 7 illustrates an exemplary logic flow of recovering an eSIM using a backup context created as in FIG. 6. At 702, the secure element detects that an eSIM has been deleted. This detection can initialize a backup recovery procedure. The knowledge of the deleted eSIM may also be based on some action of the main operating system of the mobile device in which the secure element is housed. That action could be a firmware update or a user eSIM configuration input through a user interface of the mobile device. Alternatively, the deleted eSIM can be detected by a periodic or event-driven audit in which the secure element OS checks a row of the table of instantiated eSIMs to see if an eSIM is present in the secure element. At 704, the secure element OS obtains a data blob as part of the backup recovery procedure. The data blob may be retrieved by the secure element OS pulling it from memory. Or, the data blob may be received at the secure element if pushed, for example, by the mobile device to the secure element. At 706, the secure element identifies the data blob. In some embodiments, the identifier can be an ICC-ID or a profile ID. At 708, the secure element OS searches the table of instantiated eSIMs to see if it can match the data blob identifier with an identifier in the table. When a match is found, the secure element OS decrypts the data blob at 710 using the secure processor. This decryption can occur, in some embodiments, before 706. For example, the secure element OS may attempt to decrypt the data blob after 704 using the private key of it PKI public key/private key pair. The decryption can produce one or more profile data components which represent the eSIM. The secure element OS, then, at 712, reinstalls the one or more profile data components representing the eSIM into the secure element.

Exportable Data Blob

Figure 8:
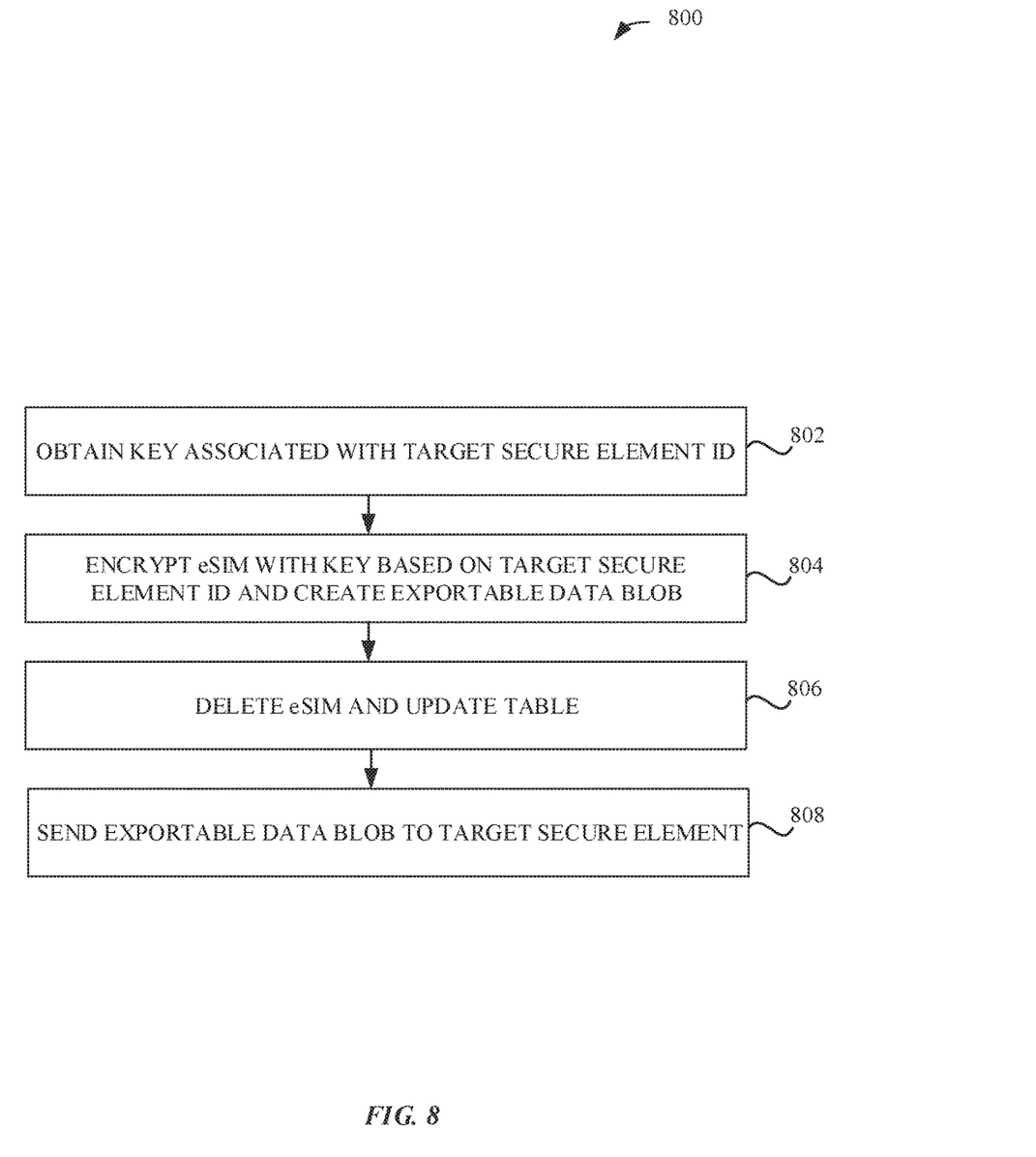
FIG. 8 illustrates exemplary logic for generating an exportable eSIM using the table of instantiated eSIMs in accordance with some embodiments.

In one embodiment, the secure element exports an eSIM. FIG. 8 illustrates exemplary logic 800 for export of an eSIM. At 802, the secure element OS obtains an identifier of a target, or destination, secure element. At 804, the secure element OS encrypts an eSIM to create an exportable data blob. For example, the encryption may be performed using the public key of the PKI public key/private key pair of the identified target secure element. The PKI public key of the target secure element can be obtained by the secure element OS by sending an inquiry based on the identifier of the target secure element to a certificate authority. Because a given eSIM cannot be in active use in two devices at the same time, at 806 the secure element OS deletes the eSIM from the secure element. The deletion and export event can be recorded in the table of instantiated eSIMs as indicated at 806. The deletion of the eSIM conforms to the trust relationship between the secure element OS and the mobile network operator associated with the eSIM. At 808, the exportable data blob is sent to the target secure element.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative Exemplary Apparatus

Figure 9:
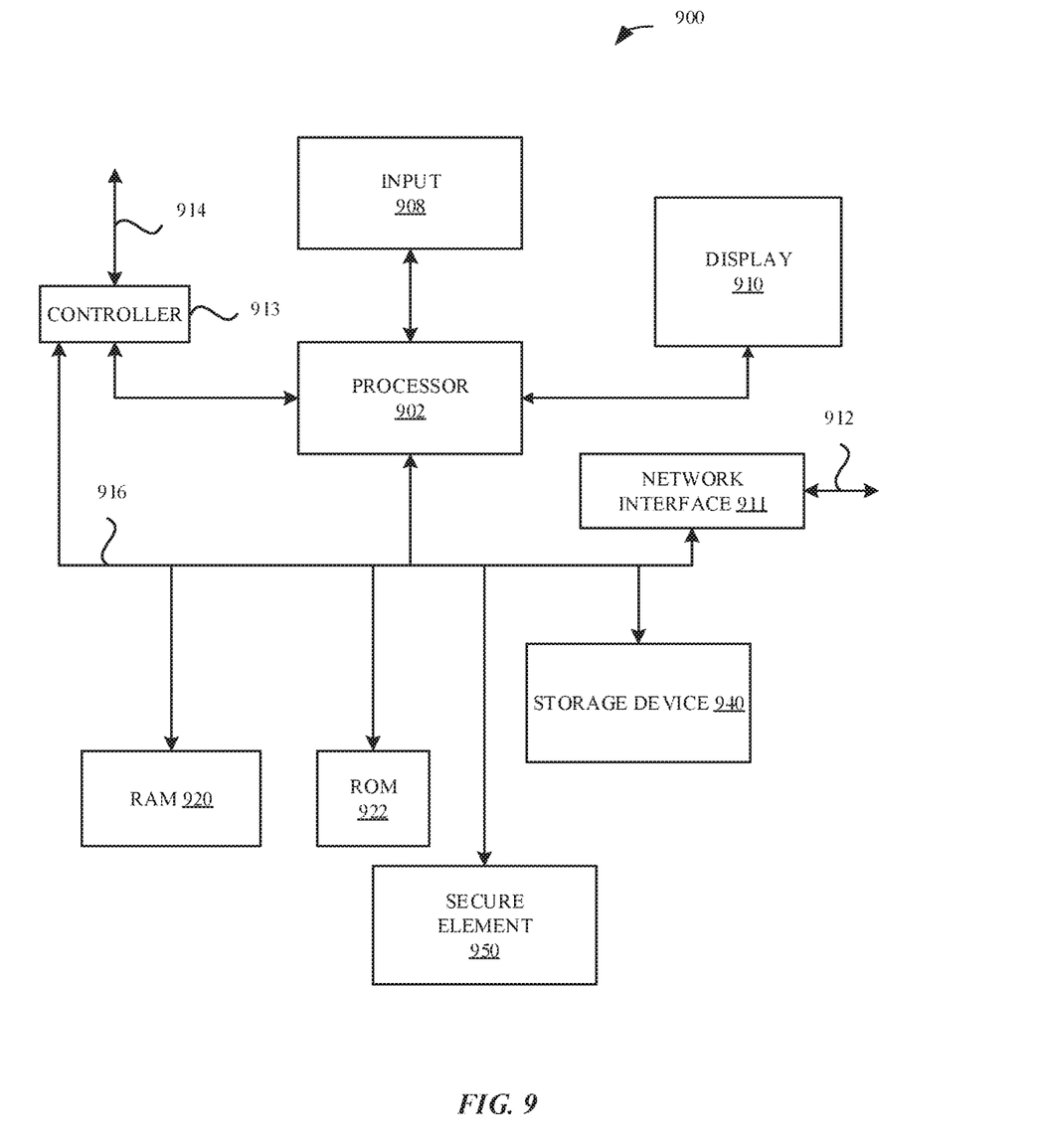
FIG. 9 illustrates an exemplary apparatus useful for implementation in accordance with some embodiments.

FIG. 9 illustrates in block diagram format an exemplary computing device 900 that can be used to implement the various components and techniques described herein, according to some embodiments. In particular, the detailed view of the exemplary computing device 900 illustrates various components that can be included in the secure element 108 and/or the mobile device 102 of FIGS. 1-3. As shown in FIG. 9, the computing device 900 can include a processor 902 that represents a microprocessor or controller for controlling the overall operation of computing device 900. The computing device 900 can also include a user input device 908 that allows a user of the computing device 900 to interact with the computing device 900. For example, the user input device 908 can take a variety of forms, such as a button, keypad, dial, touch screen, audio input interface, visual/image capture input interface, input in the form of sensor data, etc. Still further, the computing device 900 can include a display 910 (screen display) that can be controlled by the processor 902 to display information to the user (for example, information relating to incoming, outgoing, or active communication session). A data bus 916 can facilitate data transfer between at least a storage device 940, the processor 902, and a controller 913. The controller 913 can be used to interface with and control different equipment through an equipment control bus 914. The computing device 900 can also include a network/bus interface 911 that couples to a data link 912. In the case of a wireless connection, the network/bus interface 911 can include wireless circuitry, such as a wireless transceiver and/or baseband processor.

The computing device 900 also includes a storage device 940, which can comprise a single storage or a plurality of storages (e.g., hard drives), and includes a storage management module that manages one or more partitions within the storage device 940. In some embodiments, storage device 940 can include flash memory, semiconductor (solid state) memory or the like. The computing device 900 can also include a Random Access Memory ("RAM") 920 and a Read-Only Memory ("ROM") 922. The ROM 922 can store programs, utilities or processes to be executed in a non-volatile manner. The RAM 920 can provide volatile data storage, and stores instructions related to the operation of the computing device 900. The computing device 900 also includes a secure element 950.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method comprising:
   by a secure element of a mobile device:
   receiving a data binary large object (data blob) from a memory storage device external to the secure element;
   parsing the data blob to obtain an electronic Subscriber Identity Module (eSIM) identifier that is unique to the eSIM;
   searching a table that lists instantiated eSIMs of the secure element to detect an entry matching the eSIM identifier, wherein the table is stored in a secure memory of the secure element of the mobile device; and
   when the entry matching the eSIM identifier is found:
   decoding the data blob to recover an eSIM corresponding to the eSIM identifier, and
   when no entry matching the eSIM identifier is found:
   not decoding the data blob.

2. The method of claim 1, wherein the secure element is an embedded Universal Integrated Circuit Card (eUICC).

3. The method of claim 1, wherein the receiving the data blob comprises receiving the data blob from a memory of the mobile device.

4. The method of claim 1, wherein the receiving the data blob comprises receiving the data blob from an Internet-based data archive.

5. The method of claim 4, wherein the Internet-based data archive comprises an online service.

6. The method of claim 1, further comprising:
   when the entry matching the eSIM identifier is found:
   retrieving, from the secure memory, a key that is specific to the secure element, wherein the decoding is performed using the key; and
   installing the recovered eSIM on the secure element.

7. The method of claim 6, wherein the key is a private key of a public key infrastructure (PKI) key pair that is specific to the secure element.

8. The method of claim 6, wherein: i) the key is a symmetric key based on a shared secret, and ii) the shared secret is installed in the secure element in a manufacturing environment.

9. The method of claim 6, wherein:
   i) the key is an ephemeral key,
   ii) the ephemeral key is based on a private key of a first temporary public key/private key pair that is specific to the secure element, and
   iii) the ephemeral key is also based on a public key of a second temporary public key/private key pair that is specific to an eSIM provisioning server.

10. The method of claim 6, wherein the eSIM comprises a plurality of data components.

11. The method of claim 10, further comprising:
    installing a first one of the plurality of data components in a memory of the secure element.

12. The method of claim 10, further comprising:
    before receiving the data blob from the memory storage device external to the secure element:
    receiving the data blob from an eSIM provisioning server;
    parsing the data blob to obtain the eSIM identifier;
    storing the eSIM identifier in the table;
    decoding the data blob using the key to recover the eSIM;
    installing a second one of the plurality of data components in a memory of the secure element; and
    deleting the second one of the plurality of data components from the memory of the secure element.

13. The method of claim 12, wherein the deleting is performed during a firmware update.

14. The method of claim 12, wherein the deleting is performed during a troubleshooting of software.

15. The method of claim 12, wherein:
    i) the secure element is a Universal Integrated Circuit Card (UICC),
    ii) the receiving the data blob from the eSIM provisioning server occurs when the UICC is installed in a first wireless device, and
    iii) the receiving the data blob from the memory storage device external to the secure element occurs when the UICC is installed in a second wireless device.

16. A secure element configurable for operation in a mobile device, the secure element comprising:
    a secure memory; and
    a secure processor coupled to the secure memory, wherein the secure memory is configured to store instructions that, when executed on the secure processor, cause the secure element to:
    receive a data binary large object (data blob) from a memory storage device external to the secure element;
    parse the data blob to obtain an electronic Subscriber Identity Module (eSIM) identifier that is unique to the eSIM;
    search a table that lists instantiated eSIMs of the secure element to detect an entry matching the eSIM identifier, wherein the table is stored in a secure memory of the secure element; and
    when the entry matching the eSIM identifier is found:
    decode the data blob to recover an eSIM corresponding to the eSIM identifier, and
    when no entry matching the eSIM identifier is found:
    not decode the data blob.

17. The secure element of claim 16, wherein the instructions further cause the secure element to:
    when the entry matching the eSIM identifier is found:
    retrieve, from the secure memory, a key that is specific to the secure element;

decode the data blob using the key; and
install the recovered eSIM on the secure element.

18. The secure element of claim 17, wherein:
i) the key is an ephemeral key,
ii) the ephemeral key is based on a private key of a first temporary public key/private key pair that is specific to the secure element, and
iii) the ephemeral key is also based on a public key of a second temporary public key/private key pair that is specific to an eSIM provisioning server.

19. A mobile device comprising:
one or more antennas;
a secure element comprising: i) a secure processor and ii) a secure memory;
a mobile device processor;
a baseband component communicatively coupled to the one or more antennas; and
a memory, wherein:
the secure memory comprises instructions that, when executed by the secure processor, cause the secure element of the mobile device to:
receive a data binary large object (blob) from a memory storage device external to the secure element,
parse the data block to obtain an electronic Subscriber Identity Module (eSIM) identifier that is unique to the eSIM,
search a table that lists instantiated eSIMs of the secure element to detect an entry matching the eSIM identifier, wherein the table is stored in the secure memory of the secure element of the mobile device,
when the entry matching the eSIM identifier is found, decode the data blob to recover an eSIM corresponding to the eSIM identifier, and
when no entry matching the eSIM identifier is found, not decode the data blob.

20. The mobile device of claim 19, wherein the instructions further cause the secure element of the mobile device to:
when the entry matching the eSIM identifier is found:
retrieve, from the secure memory, a key that is specific to the secure element,
decode the data blob using the key, and
install the recovered eSIM on the secure element
wherein:
the key is an ephemeral key,
the ephemeral key is based on a private key of a first temporary public key/private key pair that is specific to the secure element, and
the ephemeral key is also based on a public key of a second temporary public key/private key pair that is specific to an eSIM provisioning server.

* * * * *